(12) United States Patent
Kalman et al.

(10) Patent No.: US 8,949,996 B2
(45) Date of Patent: *Feb. 3, 2015

(54) TRANSFORMING UNIT TESTS FOR SECURITY TESTING

(71) Applicant: International Business Machines Corporation, Armonk, NY (US)

(72) Inventors: Daniel Kalman, Tel-Aviv (IL); Ory Segal, Herzelyia (IL); Omer Tripp, Har-Adar (IL); Omri Weisman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,680

(22) Filed: Oct. 9, 2013

(65) Prior Publication Data

US 2014/0109228 A1 Apr. 17, 2014

Related U.S. Application Data

(63) Continuation of application No. 13/652,873, filed on Oct. 16, 2012.

(51) Int. Cl.
*H04L 9/00* (2006.01)
*G06F 21/57* (2013.01)

(52) U.S. Cl.
CPC ........ *G06F 21/577* (2013.01); *G06F 2221/033* (2013.01)
USPC ............. 726/25; 717/126; 717/124; 717/127; 717/131; 726/1; 726/22; 726/23; 714/E11.207; 714/E11.208; 714/38.1; 714/2; 714/25; 709/203; 709/227; 713/189

(58) Field of Classification Search
CPC . G06F 21/577; G06F 11/3684; G06F 11/362; H04L 63/1433
See application file for complete search history.

(56) References Cited

U.S. PATENT DOCUMENTS 5,999,739 A * 12/1999 Soni et al. ...................... 717/156
6,029,002 A * 2/2000 Afifi et al. ...................... 717/131

(Continued)

OTHER PUBLICATIONS

Tomonari Takada et al., Dependence-cache Slicing: A Program Slicing Method Using Light Weight Dynamic Information, 10th International Workshop on Program Comprehension 169-177 (2002).*

(Continued)

*Primary Examiner* — Morshed Mehedi
*Assistant Examiner* — Sharon Lynch
(74) *Attorney, Agent, or Firm* — Holland & Knight LLP; Brian J. Colandreo, Esq.; Jeffrey T. Placker, Esq.

(57) ABSTRACT

A method, computer program product, and system for transforming unit tests is described. A unit test associated with one or more software units is identified. A first input parameter of the unit test is identified. A substitute parameter value is determined, wherein the substitute parameter value is associated with a security test for the one or more software units. A value of the first input parameter in the unit test is replaced with the substitute parameter value. The unit test including the substitute parameter value is implemented for the one or more software units. A first security issue associated with the one or more software units is identified, based upon, at least in part, replacing the first input parameter of the unit test with the substitute parameter value and implementing the unit test including the substitute parameter value.

10 Claims, 4 Drawing Sheets

(56) References Cited

U.S. PATENT DOCUMENTS

| | | | |
|---|---|---|---|
| 6,694,461 B1* | 2/2004 | Treuer | 714/719 |
| 6,701,514 B1* | 3/2004 | Haswell et al. | 717/115 |
| 7,757,215 B1* | 7/2010 | Zhou et al. | 717/124 |
| 7,844,951 B2* | 11/2010 | Chen et al. | 717/124 |
| 7,849,448 B2* | 12/2010 | Yunus et al. | 717/126 |
| 8,316,448 B2* | 11/2012 | Peinado et al. | 726/25 |
| 8,381,192 B1* | 2/2013 | Drewry et al. | 717/128 |
| 8,522,083 B1* | 8/2013 | Cohen et al. | 714/38.1 |
| 2002/0066077 A1* | 5/2002 | Leung | 717/126 |
| 2003/0159063 A1* | 8/2003 | Apfelbaum et al. | 713/200 |
| 2004/0010776 A1* | 1/2004 | Shah | 717/117 |
| 2005/0193269 A1* | 9/2005 | Haswell et al. | 714/38 |
| 2006/0195588 A1* | 8/2006 | Pennington et al. | 709/227 |
| 2006/0265691 A1* | 11/2006 | Klinger et al. | 717/124 |
| 2007/0033440 A1* | 2/2007 | Tillmann et al. | 714/38 |
| 2007/0033442 A1* | 2/2007 | Tillmann et al. | 714/45 |
| 2007/0033443 A1* | 2/2007 | Tillmann et al. | 714/45 |
| 2007/0033576 A1* | 2/2007 | Tillmann et al. | 717/124 |
| 2007/0234122 A1* | 10/2007 | Lu | 714/36 |
| 2007/0240138 A1* | 10/2007 | Chess et al. | 717/143 |
| 2008/0028464 A1* | 1/2008 | Bringle et al. | 726/22 |
| 2008/0209567 A1* | 8/2008 | Lockhart et al. | 726/25 |
| 2009/0083854 A1* | 3/2009 | Bozanich et al. | 726/23 |
| 2009/0125976 A1* | 5/2009 | Wassermann et al. | 726/1 |
| 2009/0319246 A1* | 12/2009 | Takayama | 703/13 |
| 2011/0016356 A1* | 1/2011 | Artzi et al. | 714/38 |
| 2011/0016456 A1* | 1/2011 | Artzi et al. | 717/131 |
| 2011/0016457 A1* | 1/2011 | Artzi et al. | 717/131 |
| 2011/0030061 A1* | 2/2011 | Artzi et al. | 726/25 |
| 2011/0239194 A1* | 9/2011 | Braude | 717/124 |
| 2012/0272223 A1* | 10/2012 | Persson et al. | 717/140 |
| 2013/0167241 A1* | 6/2013 | Siman | 726/25 |
| 2013/0205399 A1* | 8/2013 | Kalman et al. | 726/25 |

OTHER PUBLICATIONS

Tripp et al., "TAJ: Effective Taint Analysis of Web Applications," Jan. 9, 2006, pp. 1-11.

Unit et al., "Unit Testing Security Example," http://haacked.com/archive/2007/09/21/unit-testing-security-example.aspx, Sep. 20, 2007, pp. 1-5.

Jakarta Cactus—EJB Testing with J2EE RI, http://jakarta.apache.org/cactus/writing/howto_ejb_j2eeri.html, Aug. 5, 2011, pp. 1.

"Revert to Console," http://www.reverttoconsole.com/blog/spring/spring-security-3-unit-testing-example-with-dbunit/ downloaded on Sep. 18, 2012, pp. 1-28.

Harman et al., "An Overview of Program Slicing," http://www.cs.ucl.ac.uk/staff/mharman/sf.html, downloaded Sep. 18, 2012, pp. 1-34.

Brillout et al., Mutation-Based Test Case Generation for Simulink Models, http://www.mathworks.com/rpoducts/simulink/downloaded Sep. 18, 2012, pp. 1-34.

"IBM Security AppScan Family, Application Security Testing and Risk Management," http://www-01.ibm.com/software/awdtools/appscan/downloaded Sep. 18, 2012, pp. 1-2.

* cited by examiner

TRANSFORMING UNIT TESTS FOR SECURITY TESTING

RELATED APPLICATIONS

The subject application is a continuation application of U.S. patent application with Ser. No. 13/652,873, filed on Oct. 16, 2012, the entire content of which is herein incorporated by reference.

TECHNICAL FIELD

This disclosure relates to security testing of software.

BACKGROUND

In software development and analysis it may be useful to determine whether particular software units (e.g., modules, algorithms, processes, and so on) are vulnerable to malicious attacks. For example, in the case of software including a web application, the software may be vulnerable to various types of attack such as cross-site scripting, SQL injection, log forging and so on. Use of software that is vulnerable to these and other sorts of attack may subject individuals and/or organizations to costly liability, loss, and other undesirable consequences.

BRIEF SUMMARY OF THE DISCLOSURE

According to one aspect of the disclosure, a computer-implemented method includes identifying, by one or more computing devices, a unit test associated with one or more software units. The method further includes identifying, by the one or more computing devices, a first input parameter of the unit test. The method further includes determining, by the one or more computing devices, a substitute parameter value, wherein the substitute parameter value is associated with a security test for the one or more software units. The method further includes replacing, by the one or more computing devices, a value of the first input parameter in the unit test with the substitute parameter value. The method further includes implementing, by the one or more computing devices, the unit test including the substitute parameter value for the one or more software units. The method further includes identifying, by the one or more computing devices, a first security issue associated with the one or more software units, based upon, at least in part, replacing the value of the first input parameter of the unit test with the substitute parameter value and implementing the unit test including the substitute parameter value.

One or more of the following features may be included. The method may include identifying the first input parameter, by the one or more computing devices, based upon, at least in part, static analysis of the one or more software units. The method may further include identifying the first input parameter, by the one or more computing devices, based upon, at least in part, modeling one or more testing frameworks associated with the unit test. The method may further include identifying the first security issue, by the one or more computing devices, based upon, at least in part, dynamic application security testing logic. The method may further include modifying the unit test, by the one or more computing devices, to include the dynamic application security testing logic. The method may further include cloning, by the one or more computing devices, the unit test. The method may further include determining, by the one or more computing devices, an alternative substitute parameter value for use with the cloned unit test. The method may further include identifying a second security issue associated with the one or more software units based upon, at least in part, replacing a value of a second input parameter in the cloned unit test with the alternative substitute parameter value.

The method may further include modifying the unit test, by the one or more computing devices, to reduce a required run time for the unit test including the substitute parameter value. Reducing the required run time for the unit test may include identifying, by the one or more computing devices, a data set, wherein the data set is accessed, at least in part, by the software unit as a result of the implementation of the unit test. Reducing the required run time for the unit test may further include determining, by the one or more computing devices, a substitute data set. Reducing the required run time for the unit test may further include replacing, by the one or more computing devices, a portion of the data set with the substitute data set.

According to another aspect of the disclosure, a computer program product resides on a computer readable storage medium and has a plurality of instructions stored on it. When executed by a processor, the instructions cause the processor to perform operations including identifying a unit test associated with one or more software units. The operations further include identifying a first input parameter of the unit test. The operations further include determining a substitute parameter value, wherein the substitute parameter value is associated with a security test for the one or more software units. The operations further include replacing a value of the first input parameter in the unit test with the substitute parameter value. The operations further include implementing the unit test including the substitute parameter value for the one or more software units. The operations further include identifying a first security issue associated with the one or more software units, based upon, at least in part, replacing the value of the first input parameter of the unit test with the substitute parameter value and implementing the unit test including the substitute parameter value.

One or more of the following features may be included. The plurality of instructions, when executed by the processor, may cause the processor to perform operations including identifying the first input parameter based upon, at least in part, static analysis of the one or more software units. The operations may include identifying the first input parameter based upon, at least in part, modeling one or more testing frameworks associated with the unit test. The operations may include identifying the first security issue based upon, at least in part, dynamic application security testing logic. The operations may also include modifying the unit test to include the dynamic application security testing logic. The operations may include cloning the unit test. The operations may include determining an alternative substitute parameter value for use with the cloned unit test. The operations may include identifying a second security issue associated with the one or more software units based upon, at least in part, replacing a value of a second input parameter in the cloned unit test with the alternative substitute parameter value.

The operations may include modifying the unit test to reduce a required run time for the unit test including the substitute parameter value. Reducing the required run time for the unit test may include identifying a data set, wherein the data set is accessed, at least in part, by the software unit as a result of the implementation of the unit test. Reducing the required run time for the unit test may also include determining a substitute data set. Reducing the required run time for the unit test may also include replacing a portion of the data set with the substitute data set.

According to another aspect of the disclosure, a computing system includes at least one processor and at least one memory architecture coupled with the at least one processor. The computing system also includes a first software module executable by the at least one processor and the at least one memory architecture, wherein the first software module is configured to identify a unit test associated with one or more software units. The computing system also includes a second software module executable by the at least one processor and the at least one memory architecture, wherein the second software module is configured to identify a first input parameter of the unit test. The computing system also includes a third software module executable by the at least one processor and the at least one memory architecture, wherein the third software module is configured to determine a substitute parameter value, wherein the substitute parameter value is associated with a security test for the one or more software units. The computing system also includes a fourth software module executable by the at least one processor and the at least one memory architecture, wherein the fourth software module is configured to replace a value of the first input parameter in the unit test with the substitute parameter value. The computing system also includes a fifth software module executable by the at least one processor and the at least one memory architecture, wherein the fifth software module is configured to implement the unit test including the substitute parameter value for the one or more software units. The computing system also includes a sixth software module executable by the at least one processor and the at least one memory architecture, wherein the sixth software module is configured to identify a first security issue associated with the one or more software units, based upon, at least in part, replacing the value of the first input parameter of the unit test with the substitute parameter value and implementing the unit test including the substitute parameter value.

One or more of the following features may be included. The computing system may include a seventh software module executable by the at least one processor and the at least one memory architecture, wherein the seventh software module is configured to identify the first input parameter based upon, at least in part, static analysis of the one or more software units. The computing system may include an eighth software module executable by the at least one processor and the at least one memory architecture, wherein the eighth software module is configured to identify the first input parameter based upon, at least in part, modeling one or more testing frameworks associated with the unit test. The computing system may also include a ninth software module executable by the at least one processor and the at least one memory architecture, wherein the ninth software module is configured to identify the first security issue based upon, at least in part, dynamic application security testing logic. The computing system may also include a tenth software module executable by the at least one processor and the at least one memory architecture, wherein the tenth software module is configured to modify the unit test to include the dynamic application security testing logic. The computing system may also include an eleventh software module executable by the at least one processor and the at least one memory architecture, wherein the eleventh software module is configured to clone the unit test. The computing system may also include a twelfth software module executable by the at least one processor and the at least one memory architecture, wherein the twelfth software module is configured to determine an alternative substitute parameter value for use with the cloned unit test, wherein identifying a second security issue associated with the one or more software units is based upon, at least in part, replacing a value of a second input parameter in the cloned unit test with the alternative substitute parameter value.

The computing system may also include a thirteenth software module executable by the at least one processor and the at least one memory architecture, wherein the thirteenth software module is configured to modify the unit test to reduce a required run time for the unit test including the substitute parameter value. Reducing the required run time for the unit test may include identifying a data set, wherein the data set is accessed, at least in part, by the software unit as a result of the implementation of the unit test. Reducing the required run time for the unit test may also include determining a substitute data set. Reducing the required run time for the unit test may also include replacing a portion of the data set with the substitute data set.

According to another aspect of the disclosure, a computer-implemented method includes identifying, by one or more computing devices, a unit test associated with one or more software units. The method further includes identifying, by the one or more computing devices, a first input parameter of the unit test. The method further includes determining, by the one or more computing devices, a substitute parameter value, wherein the substitute parameter value is associated with a security test for the one or more software units. The method further includes replacing, by the one or more computing devices, a value of the first input parameter in the unit test with the substitute parameter value. The method further includes modifying the unit test, by the one or more computing devices, to reduce a required run time for the unit test including the substitute parameter value. Reducing the required run time for the unit test includes identifying, by the one or more computing devices, a data set, wherein the data set is accessed, at least in part, by the software unit as a result of the implementation of the unit test. Reducing the required run time for the unit test further includes determining, by the one or more computing devices, a substitute data set. Reducing the required run time for the unit test further includes replacing, by the one or more computing devices, a portion of the data set with the substitute data set. The method further includes implementing, by the one or more computing devices, the modified unit test including the substitute parameter value for the one or more software units.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As noted above, in software development and analysis it may be useful to determine whether particular software units (e.g., modules, algorithms, processes, and so on) are vulnerable to malicious attacks. In the case of software including a web application, for example, software may be vulnerable to a variety of attack types, including SQL injection, impersonation, buffer overflow, URL interpretation, input validation, and so on. Such attacks can lead to various types of loss, risks of loss and other issues for both individuals and organizations. For example, an attack on a web application may result in disclosure of proprietary or otherwise protected information, or execution of a variety of malicious commands by a web server or other computing device.

Because of the risk of losses and other issues associated with security vulnerabilities, it may therefore be desirable to test software units for vulnerabilities, both before deployment and at various times after deployment. One issue with such testing, however, is that it may be both time consuming and expensive. For example, in order to test a web application, it may be necessary to provide a hypertext transfer protocol ("HTTP") request for each test. Further, multiple attack types are possible (including those in the non-exhaustive list above) with respect to each hypertext markup language ("HTML") parameter associated with the web application and each attack type may have many possible variants. In a web application with many HTML parameters (as may be common), therefore, a comprehensive test protocol may include thousands or tens of thousands of requests.

Additionally, with certain software units, including web applications, it may be difficult to identify the most effective way to test the functional logic of the application (e.g., the "business logic"). Particularly for security testers who have not participated in the creation (or modification) of the software units to be tested, a lack of knowledge regarding which parameters are appropriate for security testing may cause many security tests, which may unintentionally include inappropriate parameters, to merely identify high-level errors that may be far removed from the business logic of the tested software unit. This may further contribute to the required time and cost for effective security testing.

A unit test may be employed to test software units. Along with control data, usage procedures, and so on, software units may be tested to identify general operational integrity and suitability for particular purposes. Unit tests may sometimes be constructed by the authors of software applications in order to provide a mechanism to test the functionality of one or more software units (including software units associated with the business logic of the software applications). In some instances, unit tests may be focused only on identifying functionality issues for software units instead of identifying potential security vulnerabilities. By virtue of their function, however, unit tests may contain parameters that may be relatively highly relevant to the operation of the business logic (and other key aspects) of software units.

In some embodiments, a unit test transformation and security testing ("UTST") process may address issues such as the high cost and long times associated with security testing through the transformation of one or more unit tests to permit testing of software units for security issues such as vulnerability to attack. For example, in some embodiments, a UTST process may identify a unit test associated with a software unit, identify a first input parameter of the unit test, replace a value of the first input parameter with a substitute parameter value, implement the unit test including the substitute parameter value, and thereby identify a security issue associated with the software unit. In this manner, particularly when the identified first parameter may be relevant to the business (or other core) logic of a software unit, a UTST process may employ an existing unit test (transformed by the UTST process) in order to appropriately inject a security test parameter into a software unit (e.g., a software unit included in a web application). A parameter may be any input of a software unit that affects the behavior of the software unit. For example, a parameter may be an input of a software unit that flows into the business logic (or other module) of a software unit being tested.

Figure 1:
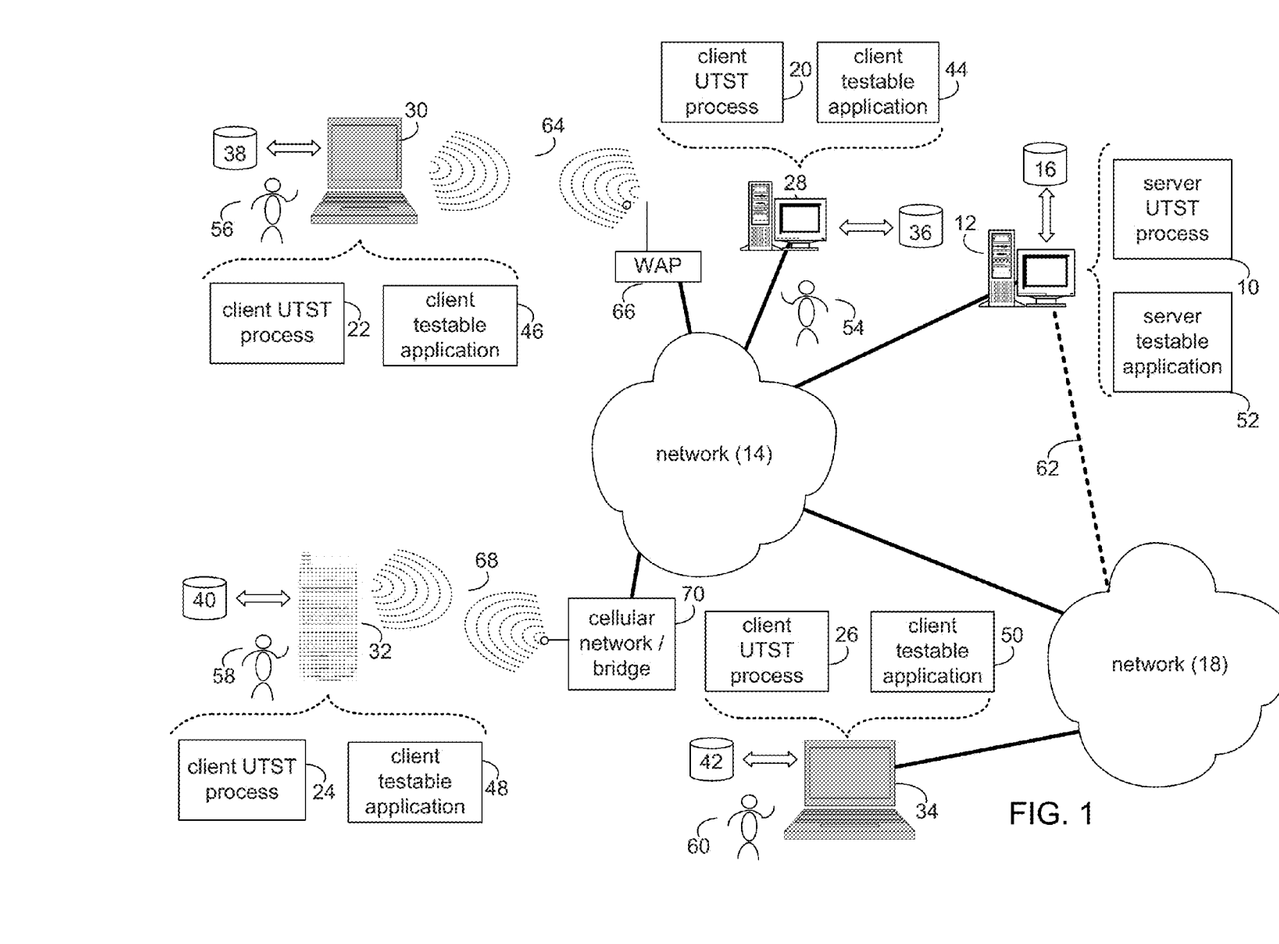
FIG. 1 is a diagrammatic view of a unit test transformation and security testing process coupled to a distributed computing network.

Referring now to FIG. 1, a UTST process may be coupled to a computer or computer network. For example, server UTST process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server UTST process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client UTST processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client UTST processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the UTST process may be a server-side process (e.g., which may be implemented via server UTST process 10), in which all of the functionality of the UTST process may be executed on a server computer (e.g., server computer 12). In an embodiment, the UTST process may be a client-side process (e.g., which may be implemented via one or more of client UTST processes 20, 22, 24, 26), in which all of the functionality of the UTST process may be executed on a client computing device (e.g., one or more of client electronic devices 28, 30, 32, 34). In an embodiment, the UTST process may be a hybrid server-client process (e.g., which may be implemented by server UTST process 10 and one or more of client UTST processes 20, 22, 24, 26), in which at least a portion of the functionality of the UTST process may be implemented via server computer 12 and at least a portion of the functionality of the UTST process may be implemented via one or more client computing devices (e.g., one or more of client electronic devices 28, 30, 32, 34).

A testable application (or process) may operate on a client device (e.g., client testable application 44, operating on client electronic device 28; client testable application 46, operating on client electronic device 30; client testable application 48, operating on client electronic device 32; or client testable application 50, operating on client electronic device 34). A client UTST process (e.g., client UTST process 20) or a server UTST process (e.g., server UTST process 10) may be in communication with a client testable application (e.g., client testable application 44) or may be part of a client testable application.

A testable application may additionally or alternatively operate on a server device (e.g., server testable application 52, operating on server computer 12 or another server testable application (not shown), operating on another server computer (not shown)). A server UTST process (e.g., server UTST process 10) or a client UTST process (e.g., client UTST process 20) may be in communication with a server testable application (e.g., server testable application 52) or may be a part of a server testable application.

A testable application (or process) may be any sort of program, process, or application that includes or otherwise utilizes a software unit and that may be tested for security-related vulnerability. For example, in one embodiment, a testable application (e.g., server testable application 52) may be a web application or process, including one or more software units (a "software unit" as referred to herein will mean a software program, application, module, algorithm, or process or a combination, sub-unit or combination of sub-units thereof.) A web application may, for example, provide various functionality to users or moderators of web sites or web services. A web application may be a front-end application, providing, for example, one or more aspects of a graphical user interface rendered to users or moderators of a web site or web service. A web application may be a back-end application, providing, for example, a process or series of processes that implement (in whole or in part) functional aspects of a web site or web service. In some embodiment, a testable application (e.g., server testable application 52) may be a different type of application or process.

Users 54, 56, 58, 60 may access a UTST process in various ways. For example, these users may access server UTST process 10 directly through the device on which a client process (e.g., client UTST processes 20, 22, 24, 26) is executed, namely client electronic devices 28, 30, 32, 34. Users 54, 56, 58, 60 may access server UTST process 10 directly through network 14 and/or through secondary network 18. Further, server computer 12 (i.e., the computer that executes server UTST process 10) may be connected to network 14 through secondary network 18, as illustrated with phantom link line 62. Users 54, 56, 58, 60 may also access a client or server testable application in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client UTST process 20 will be described for illustrative purposes. It will be understood that client UTST process 20 may, for example, interact and/or communicate with a server UTST process such as server UTST process 10 and/or may be executed within one or more applications that allow for communication with other server and/or client UTST processes. UTST process 20 may be utilized to test a variety of server and/or client testable applications, such as client testable application 44 or server testable application 52. This is not intended to be a limitation of this disclosure, as other configurations are possible (e.g., UTST process 20 may include stand-alone client processes and/or stand-alone server processes; UTST process may be utilized to test client testable application 46, 48, 50 or another server testable application or applications (not shown).) For example, some implementations may include one or more of client UTST processes 22, 24, 26 or server UTST process 10 in place of or in addition to client AM process 20.

Figure 2:
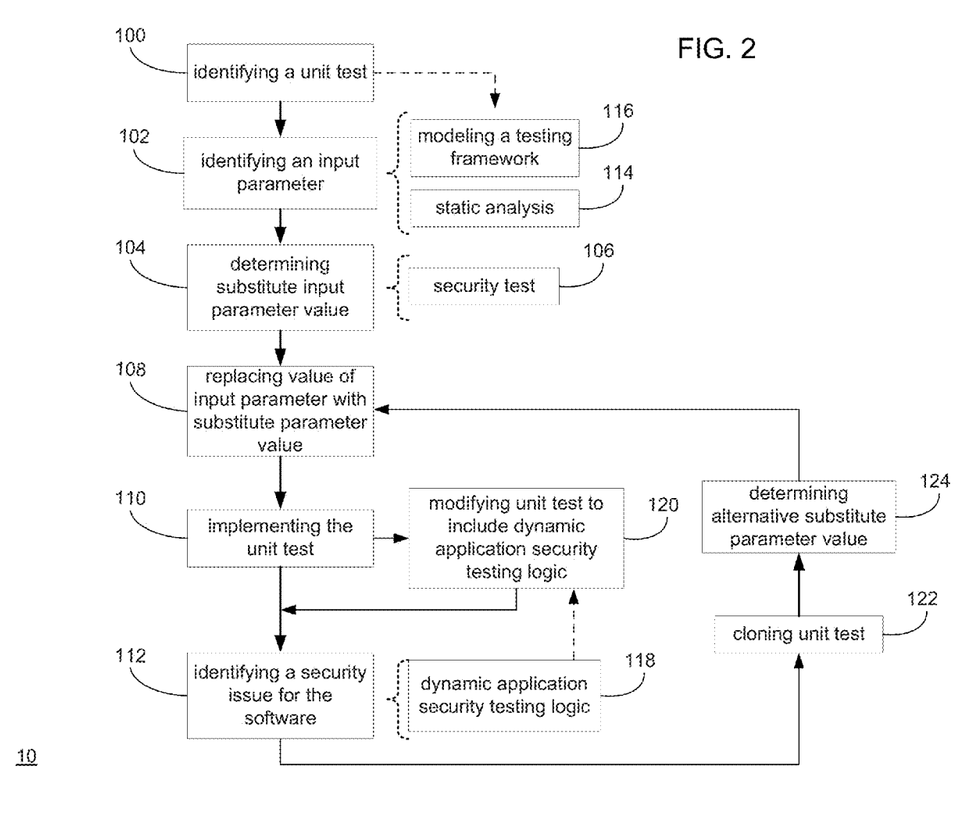
FIG. 2 is a flowchart of a process executed by the unit test transformation and testing process of FIG. 1.

Referring now also to FIG. 2, there is shown a diagrammatic view of an example process that may be implemented by a UTST process, e.g., client UTST process 20. Client UTST process 20 may identify 100 a unit test associated with one or more software units. As noted above, an as will be appreciated by those having skill in the art, a unit test may be employed to test the functionality of software units. Because unit tests may be constructed by the developers of a software unit, or others with detailed knowledge of the software structure, in some embodiments the operation of a unit test may be particularly suited for injecting a test payload into key aspects of a software unit (e.g., the business logic of the software unit). Accordingly, as part of a test for security issues associated with a software unit (e.g., security issues associated with the business logic of the software unit) it may be useful to identify 100 a unit test associated with the software unit.

Client UTST process 20 may identify 102 a first input parameter of the unit test. A unit test may include a variety of input parameters of various types. An input parameter may be for example, a string value or other data type that may be utilized by the software unit during execution or run-time. In certain embodiments, it may be useful to identify 102 an input parameter that will be utilized (e.g., accessed, manipulated, transformed, or other used) by the relevant portion of the software unit (i.e., the portion of the software unit at which the security test is directed, such as the portion implementing the business logic of the software unit). As noted above, it may be useful to identify a particular input parameter in a unit test because a unit test may be specifically designed to test one or more aspects of the functionality of the business logic (or other key elements) of a software unit.

Client UTST process 20 may determine 104 a substitute input parameter value. In some embodiments, a value of the substitute input parameter may correspond in parameter type, format and so on with the identified 102 input parameter. In some embodiments, the substitute parameter value may also be associated with a security test 106 for the one or more software units. For example, the substitute parameter value may be of similar parameter type, format and so on to the identified input parameter or may be of a different parameter type, format and so on than the identified input parameter. For example, if the input parameter is a string-variable parameter, the substitute parameter value may itself be a string-variable parameter value or may include a value of another parameter type, such as a macro or software script.

The substitute parameter value determined 104 by UTST process 20 may be associated with a security test for the one or more software units. For example, in some embodiments, the substitute parameter value may include a security test payload. A security test payload may be any sort of data or data set (e.g., a string variable, macro, software script, and so on) that when implemented as a parameter in a unit test (or otherwise) may provide assistance in identifying a security vulnerability in a software unit. For example, assuming that the identified input parameter is a field for a "name," the substitute input parameter value may include, rather than a text variable representing a name, such as "Test User" or "Norma Jean," a script designed to permit (or attempt to permit) an attacker to gain unauthorized access to data associated with the software unit, execute (or cause to be executed) one or more malicious commands, or otherwise cause or contribute to a security issue for the software units.

Client UTST process 20 may replace 108 a value of the first input parameter in the unit test with the substitute parameter value. In order to utilize the unit test to identify potential security issues, it may be useful to replace 108 the identified input parameter with a substitute parameter value, which may be, as noted above, of similar parameter type, format and so on to the identified input parameter or may be of a different parameter type, format and so on than the identified input parameter. In some embodiments, in order to replace 108 a value of the first input parameter with the substitute parameter value, UTST process 20 may format the substitute parameter value based upon the format of a value of the input parameter. so that the substitute parameter value may be accepted appropriately by the target software unit (or units).

Client UTST process 20 may implement 110 the unit test, which has been modified to include the substitute parameter value. Client UTST process 20 may implement 110 the unit test in a variety of ways. For example, in the case where the software unit to be tested is included in a web application (e.g., a web application represented by or included in server testable application 52 or client testable application 44), UTST process 20 may implement 110 the unit test by formatting a HTTP request including or otherwise associated with the unit test (including the substitute parameter value) and cause the HTTP request to be provided to the web application (or a portion thereof).

Client UTST process 20 may identify 112 a security issue associated with the one or more software units. Identifying 112 the security issue associated with the one or more software units may be based upon, at least in part, replacing 108 a value of the first input parameter of the unit test with the substitute parameter value and implementing 110 the unit test with the substitute parameter value. For example, the software unit being tested may respond in a variety of ways to the use of a substitute parameter value in the place of an input parameter associated with the unit test. In certain instances, the use of a substitute parameter value may cause an error in the software unit (or related software application) which may cause the unit (or related application) to fail to function. This may indicate that the substitute parameter value did not cause a security issue. Similarly, continuing the example above, if a the substitute parameter value for a "name" input parameter is a script intended to cause a malicious result, the treatment of the script by the software unit (or related application) as simply a text string (i.e., an actual name, rather than a script to be executed) may also indicate that the substitute parameter value did not cause a security issue. Alternatively, however, the software unit (or related application) may return an alert or other indication that the script was used as a script rather than a test string (or that the script or another substitute parameter value was used in another way indicating a security vulnerability). In this case, UTST process 20 may identify 112, based on the use of the script as a script (e.g., rather than a test string) or another indication, that use of the unit test with the substitute parameter value caused a security issue for the software unit (or related application).

In certain embodiments, identifying 102 an appropriate input parameter may be an element of identifying 112 security issues. For example, although a unit test may include a variety of input parameters, only certain of the input parameters may be accessed or otherwise utilized (directly or indirectly) by a particular implementation of the unit test for one or more software units. Further, in some embodiments, only certain of the input parameters for a given unit test may be relevant to the testing for security vulnerabilities. For example, certain input parameters that may be utilized during the execution of a unit test may not be utilized by (or otherwise impact) the core functionality (e.g., the business logic) of a software unit (or a related application). As such, if a security test payload were to be substitute for the value of one of these input parameters, the implementation of the transformed unit test (i.e., the unit test utilizing a substitute input parameter) may not provide relevant information as to the potential security vulnerability of the software unit (or related application) to be tested.

As such, in one embodiment, identifying 102 a relevant first input parameter may be based upon, at least in part, static analysis 114 of the one or more software units. Static analysis (or static program analysis) is a form of analysis of software units that does not require actual execution of the software units. For example, static analysis may include a technique such as program slicing. Program slicing may include a technique by which a set of program statements affecting the values of a particular variable (or other aspect of a software unit), for a set of all possible inputs for a particular statement, may be identified. Program slicing, in some embodiments, may include decomposition that extracts from a software unit (or related application) a set of statements that may be relevant to a particular computation. As such, the use of program slicing may permit the identification of semantically meaningful decompositions of a software unit (or related application). UTST process 20 may accordingly utilize program slicing (or another form of static analysis) to identify one or more input parameters of the unit test that may be utilized (directly or indirectly) by relevant aspects of the software unit to be tested and for which use of a security-test-related substitute parameter value may therefore be appropriate.

In some embodiments, identifying 102 the first input parameter may be based upon, at least in part, modeling 116 one or more testing frameworks associated with the unit test. A framework may be a software abstraction indicating generic functionality, around which a programmer may create a more specific implementation of various protocols or algorithms directed toward a particular purpose. As relates to testing of software units, a testing framework may accordingly include a generic and reusable software platform intended to facilitate the testing of software units without the devotion of significant time to low-level details of the testing system. In this manner, a particular unit test may embody one or more particular testing frameworks.

In the context of unit testing, therefore, various testing frameworks may be identified which are widely used (or otherwise known) and therefore subject to analysis in order to determine an input parameter that may be relevant to security testing. Accordingly, in certain embodiments, through the analysis of a particular framework, UTST process 20 may identify 102 a particular input parameter as relevant to a particular security test. In other words, semantic analysis of common (and other) frameworks may inform an analysis of how data fed into interfaces (e.g., application programming interfaces ("APIs")) exposed by the framework flow into relevant portions of a software applications (e.g., the business logic of a software unit). For example, based on modeling 116 of a common unit testing framework associated with the Java programming language, UTST process 20 may identify 102 an input parameter in a Java-based unit test which may be utilized by the business logic of a particular software unit and therefore may provide a useful substitution point to inject a security-test payload.

As an example of modeling 116 a testing framework to identify a relevant input parameter, the Cactus framework for the Java programming language may include a framework for testing a web application such as the following mock implementation of HtttpRequest via "WebRequest":

```
public void beginXXX(WebRequest theRequest) {
    // Set up HTTP related parameters
    theRequest.setURL("testbed.testsuit.net", "/mytestableapp")
        "/test/test.jsp", null, null);
    theRequest.addCookie("cookiename", "cookievalue");
}
```

Based on known or determined aspects of such testing framework, UTST process 20 may model 116 such testing framework in order to identify appropriate aspects of the unit test. For example, UTST process 20 may identify, based on modeling of the Cactus framework, that this unit test permits a tester to set a URL address so as to direct a request to a particular servlet to be tested. Based on this modeling, UTST process 20 may further identify 102, based on analysis of this framework, that the second argument of WebRequest.addCookie may be a relevant value of an input parameter for replacing 108 with a substitute parameter value, simulating a situation in which a user has filled in form values and submitted a real request. Accordingly, by modeling 116 the framework to determine the nature of the various unit test parameters, UTST process 20 may determine that the second argument of WebRequest.addCookie may be a relevant parameter to replace 108 with a security-testing parameter value.

Identifying 112 the security issue may be based upon, at least in part, dynamic application security testing ("DAST") logic 118. DAST logic may be an algorithm or process (or set of algorithms or processes) designed to detect security vulnerabilities or indications of security vulnerabilities for an application in its executing state. DAST logic may be embodied, for example, in commercial products such as IBM AppScan® for the testing of compiled applications (and other software elements) for security issues. (AppScan is a registered trademark of International Business Machine Corp. in the United States, other countries, or both.) DAST logic may include, for example, reducing a response to a request (or input) to a string value and parsing the string in order to determine how the injected security-testing parameter value appears in the string (if at all). (It will be understood that this example is not intended as a limit to DAST logic protocols, which may be embodied in a variety of other tests.)

In order to identify 112 a security issue associated with a software unit (or related application), UTST process 20 may employ DAST logic 118. In some embodiments, this may include applying DAST logic to the results of implementing 110 the unit test including the substitute parameter value. Implementation of DAST logic 118 may occur at various points in the execution of the unit test. For example, in some embodiments it may be appropriate to apply DAST logic 118 only at the end of the unit test processes. In other embodiments, however, it may be useful to apply DAST logic 118 at various points during the execution of the unit test process as may be appropriate, for example, to identify the earliest point at which the substituted security-test payload reaches (or inappropriately is handled by or otherwise affects) the applicable business logic or to identify another critical point in the execution of the unit test and the handling of the security-test payload.

Identifying 112 the security issue based upon, at least in part, dynamic application security testing logic 118 may include modifying 120 the unit test to include the DAST logic. In some embodiments, DAST logic may be implemented after the unit test has concluded. In other embodiments, however, DAST logic may be included in the unit test, by modifying 120 the unit test. In this way, the unit test may inject a security-testing payload into the software unit and then analyze, via DAST logic, the results of the operation of the software unit with the security-testing payload as substitute parameter.

Continuing the example above, for example, a web application may receive an HTTP request (i.e., an HTTP request associated with a transformed unit test including a security-testing payload as a substitute input parameter value) and return an HTML page. The transformed unit test may, for example, inject a script into an input parameter for a "name" input. If the web application operates without a security issue in this specific regard, it may deny the request as an error or treat the script itself simply as a text "name." Alternatively, as may be indicative of security issue in this regard, the web application may return an alert or other indication that the script was used as a script or that the value of the substitute input (or a related parameter) otherwise appears in the web application output in a way that indicates a vulnerability. In one embodiment, UTST process 20 may receive such output from the transformed unit test (or from the web application) and analyze the output through a process separate from the transformed unit test (e.g., through a standalone DAST logic application). In an embodiment, UTST process 20 may receive the response from the web application as an object inside (or input to) the transformed unit test, as UTST process 20 may have modified 120 the unit test to include DAST logic. Accordingly, in this embodiment, the transformed unit test may itself analyze the response from the web application using DAST logic and provide an output indicating the presence (or absence) of a security issue in this regard.

An output from UTST process 20 may take various formats, including, for example, a variety of reports that may be used by users of UTST process 20 or by other applications or processes in order to identify the presence (or absence) of security issues or potential security issues. An output from UTST process 20 may be provided at a variety of times, including, for example, when an appropriate input parameter is identified 102, when a substitute input parameter value is determined 104, when the unit test is implemented 110, when the substitute input parameter value reaches the business logic of the software unit, and/or when a security issue is identified 112.

UTST process 20 may further clone 122 the unit test. Once an appropriate unit test and/or input parameter has been identified, it may be useful to implement 110 the unit test multiple times, potentially replacing 108 one or more input parameters with multiple different substitute input parameter values. Accordingly, once UTST process 20 has identified 100 a unit test, identified 102 an input parameter, determined 104 a substitute input parameter value, implemented 110 the unit test, and/or otherwise determined or completed an aspect of transforming a particular unit test to identify security issues, UTST process may clone 122 the unit test for potential use with a different substitute parameter value.

UTST process 20 may determine 124 an alternative substitute parameter value for use with the cloned unit test. In this way, UTST process 20 may reuse an identified 100 unit test including, in some embodiments, a particular identified 102 relevant input parameter, in order to execute a variety of security tests for a given software unit. Accordingly, identifying 112 a second security issue associated with the unit test may be based upon, at least in part, replacing 108 a value of an input parameter in the cloned unit test with the alternative substitute parameter value associated with an alternative security test and implementing 110 the transformed unit test including the alternative substitute parameter value.

As such, UTST process 20 may identify a second input parameter in the cloned unit test (which may correspond to the first input parameter, the first substitute parameter, and/or a different input parameter). UTST process 20 may further identify 112 a second security issue (which may be the same security issue or issue type or a different security issue or issue type than the first security issue) based upon replacing 108 a value of the second input parameter with the alternative substitute parameter value and implementing 110 the transformed unit test.

Figure 3:
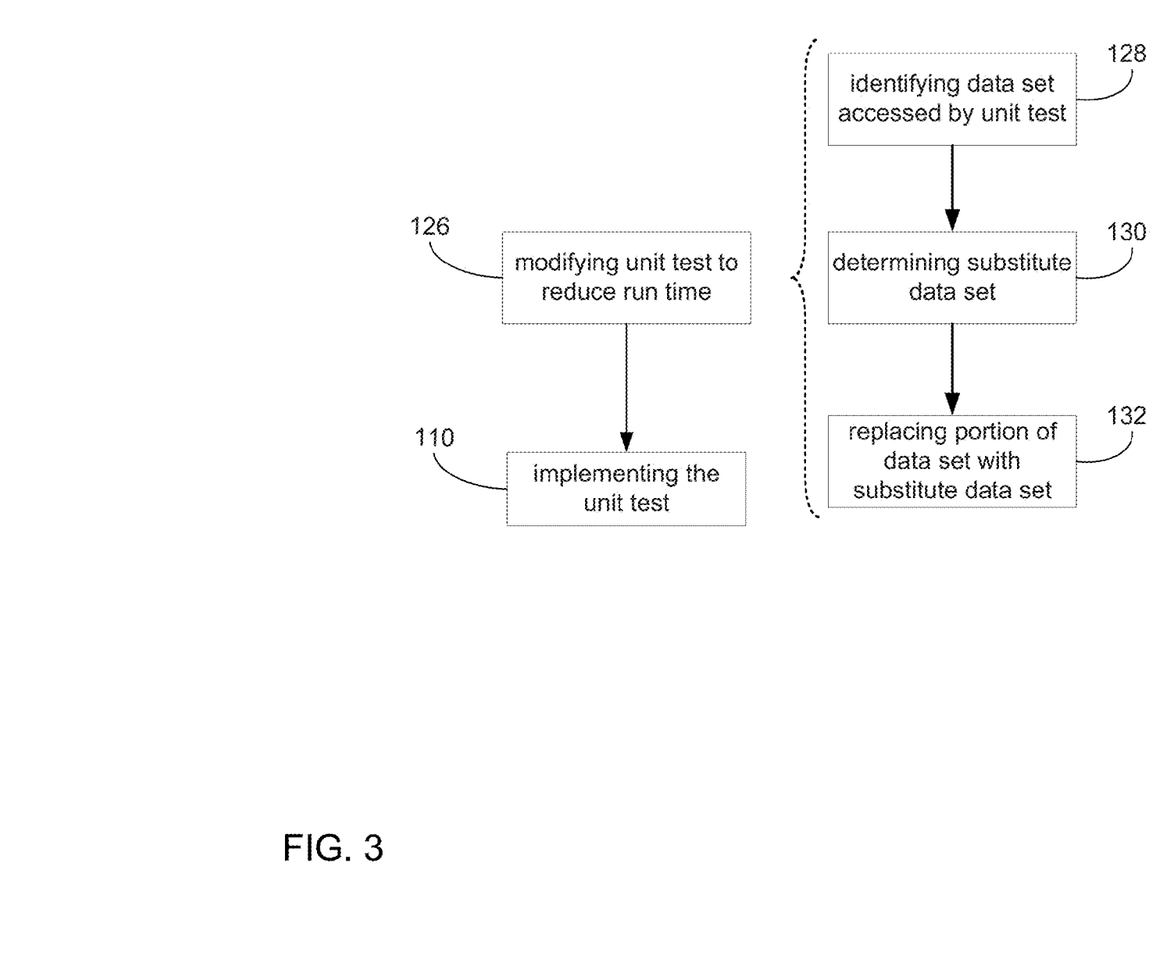
FIG. 3 is a flowchart of another process executed by the unit test transformation and testing process of FIG. 1.

Referring now also to FIG. 3, in some embodiments, before implementing 110 the unit test, UTST process 20 may modify 126 the unit test to reduce a required run time for the unit test including the substitute parameter value. It will be understood that implementation of a unit test may require a certain amount of time, based on various aspects of the unit test including the number, type and size of input parameter values, the operation of the software unit to be tested, and other factors. It will be further understood that when many unit tests are to be transformed and/or implemented, as may be necessary, for example, to complete a full complement of security tests, the run time of the transformed unit test may have a direct bearing on the time and cost of the implementation. Accordingly, it may be useful for UTST process 20 to modify 126 the unit test in order to reduce the run time of the unit test. In this way, the total cost and time of implementing a full complement of security tests (via one or more transformed unit tests) may be reduced.

Modifying 126 the unit test to reduce the required run time may include a variety of modifications. For example, modifying 126 the unit test to reduce run time may include identifying 128 a data set, wherein the data set is accessed (directly or indirectly), at least in part, by the one or more software units as a result of the implementation of the unit test. Modifying 126 the unit test to reduce run time may also include determining 130 a substitute data set, and replacing 132 a portion of the data set with the substitute data set. In some embodiments, a software unit (or related application) may access a data set as part of the implementation of a unit test. It will be understood that, in this context, "access" may refer to retrieval of the data set (or a portion thereof) from a process within the unit test or from an external resource, including a different software application or a data storage device, or may refer to generating the data set (or a portion thereof) or causing a different software unit to generate the data set (or a portion thereof). For example, the software unit may access the data set by generating the data set using one or more algorithms or may access the data set by retrieving the data set from a separate storage device or process.

In some embodiments, the content of such a data set may not be relevant to the security test to be implemented through the implementation of the transformed unit test. Accordingly, the time and resources dedicated by the software unit (or related application) to generate or otherwise access the data set may represent an avoidable cost of implementing the unit test. Accordingly, UTST process 20 may determine 130 a substitute data set (e.g., by generating a random data set matching relevant parameters such as size or data type of the identified 128 data set) and replace 132 all (or a portion) of the identified 128 data set with the determined 130 substitute data set.

In some embodiments, UTST process 20 may modify 126 a unit test by, for example, removing one or more input parameters that may have little or no relevance to the security test that is to be implemented, and the removal of which may have little or no meaningful impact on the operation of the unit test, with respect to the security test to be implemented. For example, if a particular input parameter is utilized by the software unit to be tested, but only in a way that is irrelevant (in whole or in part) to the security testing to be implemented, and if removal of that particular input parameter from the unit test does not prevent the implementation of the unit test (e.g., removal of the input parameter does not cause the software unit (or a related application) to fail), UTST process 20 may remove that input parameter in order to reduce the run time of the transformed unit test.

Figure 4:
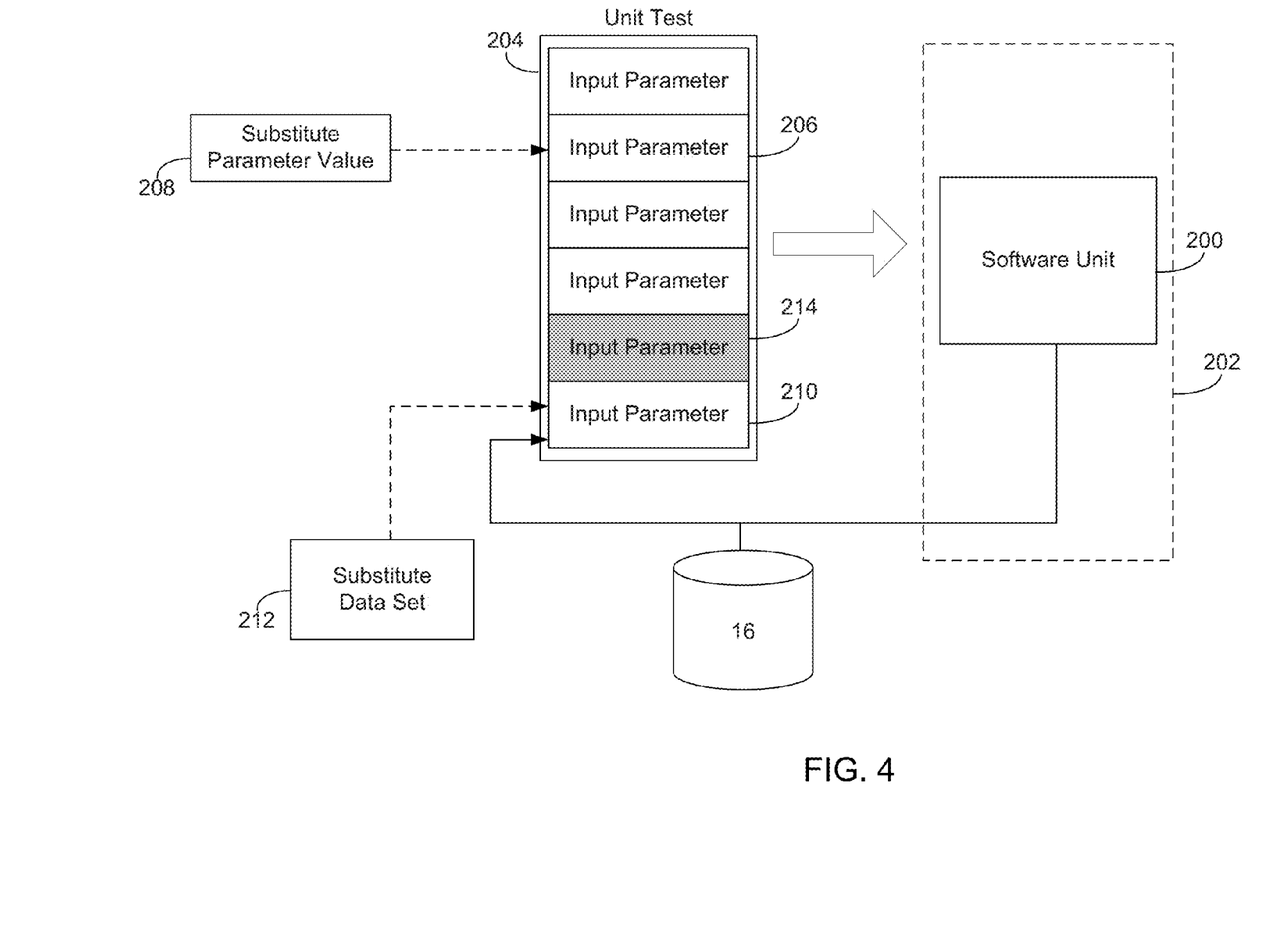
FIG. 4 is a diagrammatic view of an implementation of the unit test transformation and security testing process of FIG. 1.

Referring now also to FIG. 4, an example of an implementation of UTST process 20 is presented. In FIG. 4, software unit 200 may be part of a larger software application, which may be, for example, web application 202. Unit test 204 may be associated with software unit 200 (and/or web application 202) and may include various input parameters. In one embodiment, UTST process 20 may identify 100 unit test 204 associated with web application 202 and identify 102 a relevant input parameter, e.g., input parameter 206. As will be understood from the discussion above, UTST process 20 may identify 102 input parameter 206 using a variety of processes and/or methodologies, including, for example, static analysis 114 or modeling 116 a testing framework. UTST process 20 may then determine 104 substitute parameter value 208 and modify unit test 204 by replacing 108 a value of input parameter 206 with substitute parameter value 208. UTST process 20 may then implement 110 unit test 204, which has been transformed to include substitute parameter value 208, via software unit 200 (and/or web application 202).

In an embodiment, UTST process 20 may identify 128 that input parameter 210 is (or causes software unit 200 and/or web application 202 to generate) a large data set. For example, UTST process 20 may identify 128 input parameter 210 as including a large data set that is generated via a calculation by software unit 200 that is implemented with respect to aspects of input parameter 210 and a data set stored in data storage device 16. UTST process 20 may further determine, for example, that the information embodied in the data set is not relevant to the security test to be implemented through transformed unit test 204. In order to reduce the run time associated with implementation of unit test 204, UTST process 20 may accordingly determine 130 substituted data set 212 (e.g., by substitution of a set of random numbers or other data corresponding to the data type and/or format of the data set originally associated with input parameter 210) and replace 132 all or a portion of the data set associated with input parameter 210 with substitute data set 212. In this way, UTST process 20 may further reduce the run time associated with implementation of unit test 204 (e.g., by reducing and/or eliminating generation of the large data set via a calculation by software unit 200).

In an embodiment, as a further example, UTST process 20 may determine that input parameter 214 is not necessary to the security test associated with substitute parameter 208, that processing of input parameter 214 by software unit 200 (and/or web application 202) may involve significant time and/or use of resources, and that removal of input parameter 214 from unit test 204 may not meaningfully impact the implementation of unit test 204 for the purposes of the security testing. Accordingly, as indicated by the grayed out portion of unit test 204, UTST process 20 may remove input parameter 214 and/or aspects of unit test 204 that are associated with input parameter 214 (e.g., various lines of code) from unit test 204.

As an example, UTST process 20 may identify a functional unit test as in the "public void testXXX ( )" in the illustrative example below:

```
public void testXXX ( )
{
    // Initialize class to test
    SampleServlet servlet = new SampleServlet( );
    // Set a variable in session as the doSomething( ) method that we are testing need
    // this variable to be present in the session (for example)
    session.setAttribute ("name", "value");
    // Call the method to test, passing an HttpServletRequest object (for example)
    String result = servlet.doGet(request);
    // Perform verification that test was successful
    assertEquals("something", result);
    assertEquals ("otherValue", session.getAttribute("otherName"));
}
```

With respect to this unit test, UTST process 20 may, for example, by static analysis 114 or by modeling 116 the testing framework associated with public void testXXX( ), identify 102 the second argument of "session.setAttribute" ("value") as a relevant input parameter. UTST process 20 may then replace 108 a value of the input parameter, as outlined below, with a particular substitute security test payload (i.e., "payload"). UTST process 20 may also modify 120 the unit test to include DAST logic (i.e., a search for the payload signature inside the response string):

```
public void testXXX ( )
{
    // Initialize class to test
    SampleServlet servlet = new SampleServlet( );
    String payload = "<script> alert(1) </script>
    session.setAttribute ("name", payload);
    // Call the method to test, passing an HttpServletRequest object (for example)
    String result = servlet.doGet(request);
    // Perform security validations: a grep type operation searching for the payload signature inside the response string
    validatePayloadInResponse(response.getRawResponse( ), payload);
}
```

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
identifying, by one or more computing devices, a unit test associated with one or more software units;
identifying, by the one or more computing devices, a first input parameter of the unit test using program slicing;
determining, by the one or more computing devices, a substitute parameter value, wherein the substitute parameter value is associated with a security test for the one or more software units;
replacing, by the one or more computing devices, a value of the first input parameter in the unit test with the substitute parameter value, wherein the substitute parameter value includes a parameter type that is different than a parameter type of the first input parameter of the unit test;
implementing, by the one or more computing devices, the unit test including the substitute parameter value for the one or more software units;
and identifying, by the one or more computing devices, a first security issue associated with the one or more software units, based upon, at least in part, dynamic application security testing logic and without generating an error in the unit test upon replacing the value of the first input parameter of the unit test with the substitute parameter value and implementing the unit test including the substitute parameter value, wherein implementing the unit test including the substitute parameter value includes implementing the substitute parameter value as the different parameter type that is executable rather than implementing the substitute parameter value as the first input parameter type that is non-executable, and modifying the unit test to reduce a required run time for the unit test including the substitute parameter value by identifying a data set, wherein the data set is accessed, at least in part, by the software unit as a result of the implementation of the unit test; determining a substitute data set; and replacing a portion of the data set with the substitute data set.

2. The method of claim 1 further comprising:
identifying the first input parameter based upon, at least in part, static analysis of the one or more software units.

3. The method of claim 1 further comprising:
identifying the first input parameter based upon, at least in part, modeling one or more testing frameworks associated with the unit test.

4. The method of claim 1 further comprising: modifying the unit test to include the dynamic application security testing logic.

5. The method of claim 1 further comprising:
cloning the unit test;
determining an alternative substitute parameter value for use with the cloned unit test; and
identifying a second security issue associated with the one or more software units based upon, at least in part, replacing a value of a second input parameter in the cloned unit test with the alternative substitute parameter value.

6. A computer-implemented method comprising:
identifying, by one or more computing devices, a unit test associated with one or more software units;
identifying, by the one or more computing devices, a first input parameter of the unit test;
determining, by the one or more computing devices, a substitute parameter value, wherein the substitute parameter value is associated with a security test for the one or more software units;
replacing, by the one or more computing devices, a value of the first input parameter in the unit test with the substitute parameter value, wherein the substitute parameter value includes a parameter type that is different than a parameter type of the first input parameter of the unit test;

modifying the unit test to generate a modified unit test, by the one or more computing devices, to reduce a required run time for the unit test including the substitute parameter value, wherein modifying the unit test comprises
identifying, by the one or more computing devices, a data set, wherein the data set is accessed, at least in part, by the software unit as a result of the implementation of the unit test;
determining, by the one or more computing devices, a substitute data set; and
replacing, by the one or more computing devices, a portion of the data set with the substitute data set; and
implementing, by the one or more computing devices, the modified unit test including the substitute parameter value for the one or more software units,
identifying a first security issue associated with the one or more software units, based upon, at least in part, dynamic application security testing logic and without generating an error in the modified unit test upon replacing the value of the first input parameter of the modified unit test with the substitute parameter value and implementing the modified unit test including the substitute parameter value, wherein implementing the modified unit test including the substitute parameter value includes implementing the substitute parameter value as the different parameter type that is executable rather than implementing the substitute parameter value as the first input parameter type that is non-executable.

7. The computer-implemented method of claim 6 further comprising:
identifying the first input parameter based upon, at least in part, static analysis of the one or more software units.

8. The computer-implemented method of claim 6 further comprising:
identifying the first input parameter based upon, at least in part, modeling one or more testing frameworks associated with the unit test.

9. The computer-implemented method of claim 6 wherein modifying the unit test includes modifying the unit test to include the dynamic application security testing logic.

10. The computer-implemented method of claim 6 further comprising:
cloning the unit test;
determining an alternative substitute parameter value for use with the cloned unit test; and
identifying a second security issue associated with the one or more software units based upon, at least in part, replacing a value of a second input parameter in the cloned unit test with the alternative substitute parameter value.

* * * * *